United States Patent
Roche

(12) 
(10) Patent No.: US 8,701,854 B2
(45) Date of Patent: Apr. 22, 2014

(54) FRICTION PLATES AND VARIOUS METHODS OF MANUFACTURE THEREOF

(75) Inventor: Michael J. Roche, Tinley Park, IL (US)

(73) Assignee: BorgWarner Inc., Auburn Hills, MI (US)

(*) Notice: Subject to any disclaimer, the term of this patent is extended or adjusted under 35 U.S.C. 154(b) by 931 days.

(21) Appl. No.: 11/499,202

(22) Filed: Aug. 4, 2006

(65) Prior Publication Data

US 2007/0029157 A1    Feb. 8, 2007

Related U.S. Application Data

(60) Provisional application No. 60/705,581, filed on Aug. 4, 2005.

(51) Int. Cl.
  *F16D 13/68*    (2006.01)
  *F16D 69/04*    (2006.01)

(52) U.S. Cl.
  USPC .................. 192/107 M; 192/113.36; 264/239

(58) Field of Classification Search
  None
  See application file for complete search history.

(56) References Cited

U.S. PATENT DOCUMENTS

| | | | | |
|---|---|---|---|---|
| 3,176,804 A | * | 4/1965 | Erickson | 192/107 T |
| 3,238,087 A | * | 3/1966 | Norwalk et al. | 428/417 |
| 3,306,401 A | * | 2/1967 | Dasse | 188/251 M |
| 3,927,241 A | * | 12/1975 | Augustin | 428/408 |
| 3,932,568 A | * | 1/1976 | Watts et al. | 192/107 M |
| 4,674,616 A | * | 6/1987 | Mannino, Jr. | 192/107 R |
| 4,724,112 A | | 2/1988 | Kabayama | |
| 5,332,075 A | | 7/1994 | Quigley et al. | |
| 6,345,711 B1 | | 2/2002 | Sullivan | |
| 6,370,755 B1 | | 4/2002 | Wakamori | |
| 6,419,065 B1 | * | 7/2002 | Mieda | 192/70.2 |
| 6,474,452 B2 | * | 11/2002 | Velayutha | 188/251 A |
| 6,524,681 B1 | | 2/2003 | Seitz et al. | |
| 6,638,390 B1 | | 10/2003 | Sizelove et al. | |
| 6,655,519 B2 | | 12/2003 | Wakamori | |
| 7,051,844 B2 | * | 5/2006 | Sandberg et al. | 188/71.5 |
| 7,237,657 B2 | * | 7/2007 | Kinoshita et al. | 188/71.6 |
| 2002/0084167 A1 | | 7/2002 | Wakamori | |
| 2003/0029687 A1 | | 2/2003 | Marchisseau | |
| 2003/0047285 A1 | * | 3/2003 | Collis | 156/510 |
| 2005/0015954 A1 | | 1/2005 | Wakamori | |
| 2005/0016813 A1 | | 1/2005 | Watanabe et al. | |
| 2005/0186870 A1 | | 8/2005 | Maruo et al. | |
| 2006/0293455 A1 | * | 12/2006 | Jiang et al. | 525/191 |

FOREIGN PATENT DOCUMENTS

| | | |
|---|---|---|
| EP | 1 106 859 A1 | 6/2001 |
| GB | 2 096 654 A * | 10/1982 |
| GB | 2 148 187 A | 5/1985 |
| JP | 357009330 A | 1/1982 |
| JP | 62141319 | 6/1987 |
| JP | S6327731 | 2/1988 |

(Continued)

OTHER PUBLICATIONS

Translation of description of WO 02/070916 A1.*

(Continued)

*Primary Examiner* — Rodney Bonck
(74) *Attorney, Agent, or Firm* — BrooksGroup

(57) ABSTRACT

An automotive car and truck transmission clutch module friction plate and a method of manufacture thereof is provided wherein the friction plate is fabricated from a polymeric material, which is less expensive and lighter than comparable steel friction plates.

19 Claims, 2 Drawing Sheets

(56) References Cited

FOREIGN PATENT DOCUMENTS

| | | | |
|---|---|---|---|
| JP | 01-218811 A | * | 9/1989 |
| JP | 402176224 A | | 7/1990 |
| JP | 6257632 | | 9/1994 |
| JP | H07010564 | | 2/1995 |
| JP | 09042318 | | 10/1997 |
| JP | 2005120163 | | 5/2005 |
| WO | WO 99/64755 A1 | | 12/1999 |
| WO | WO 02/070916 A1 | | 9/2002 |

OTHER PUBLICATIONS

Translation of claims of WO 02/070916 A1.*
Translation of JP 1-218811.*
McGraw Hill Dictionary of Scientific Terms and Technical Terms, Sixth Edition, Copyright 2003, p. 2013.

* cited by examiner

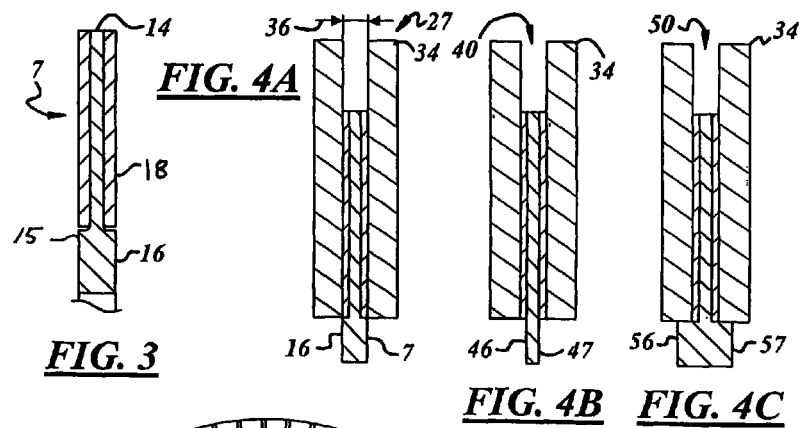
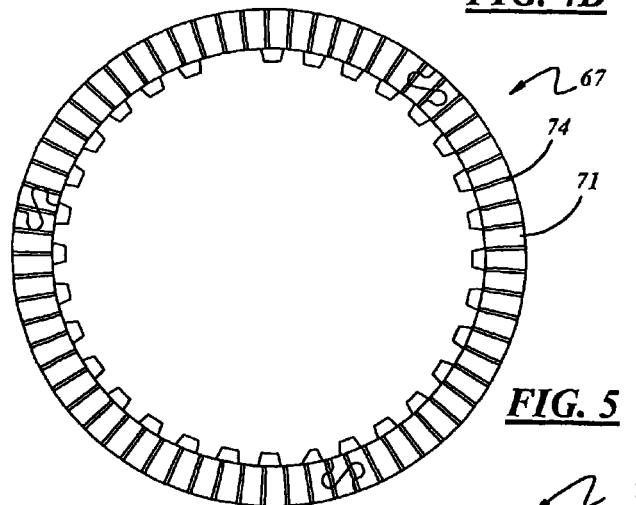
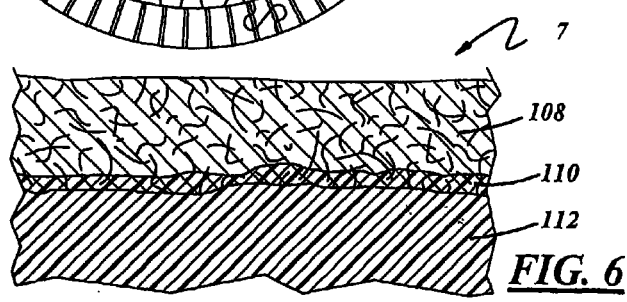

FRICTION PLATES AND VARIOUS METHODS OF MANUFACTURE THEREOF

CROSS-REFERENCE TO RELATED APPLICATIONS

This application claims the benefit of U.S. Provisional Application No. 60/705,581, filed Aug. 4, 2005.

FIELD OF THE INVENTION

The field of the present invention is that of friction plates. More particularly the present invention relates to friction plates used in wet friction clutch modules in automotive transmissions for car and truck vehicles.

BACKGROUND OF THE INVENTION

Currently, most if not all friction plates used in automotive transmissions are fabricated from steel stampings. Steel as a commodity has most recently experienced a high demand that has highly escalated its cost. To meet various environmental, economic, and national defense concerns, there has been an increased demand for fuel efficiency in automotive vehicles. Accordingly, there is a desire to achieve weight and cost savings in vehicle components.

SUMMARY OF THE INVENTION

To make manifest the above noted desires, a revelation of the present invention is brought forth. In a preferred embodiment, the present invention provides a friction plate and a method of manufacture thereof wherein the friction plate is fabricated from a polymeric material, which is less expensive and lighter than comparable steel friction plates.

Other features of the invention will become more apparent to those skilled in the art as the invention is further revealed in the accompanying drawings and detailed description of the invention.

BRIEF DESCRIPTION OF THE DRAWINGS

FIG. 3 is an enlargement of the core plate shown in FIG. 2 and is a partial sectional view of a friction disc shown in FIG. 1.

FIGS. 4A-4C are partial side elevational views of a portion of a friction pack module utilizing various embodiments of friction plates of the present invention.

FIG. 5 is a view similar to FIG. 1 of an alternative preferred embodiment friction plate of the present invention.

FIG. 6 is an enlarged partial sectional view showing an interface between a core plate and a backing.

DETAILED DESCRIPTION OF THE INVENTION

Figure 1:
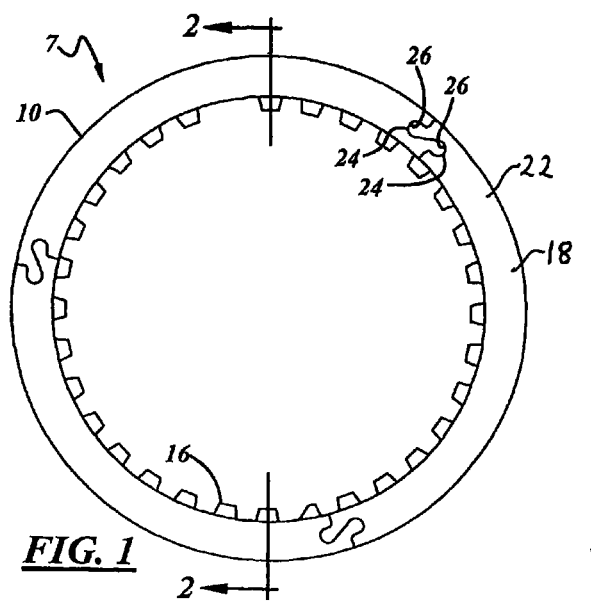
FIGS. 1 and 1A are front elevational views of preferred embodiment friction plates of the present invention.

A friction plate 7 is provided in FIG. 1. The friction plate 7 has an annular core plate 10. Preferably, the core plate 10 is fabricated from a polymeric material. A preferred material is a semi-crystalline thermo plastic such as nylon or other suitable plastic. The core plate material may be reinforced with glass fibers or other materials for added strength and/or heat capacity. Thermoset plastic material may also be used.

The core plate 10 has an integral reduced thickness rim portion 14. The core plate 10 may be fabricated from a sheet material or may be injection, compression, or extrusion molded. Typical core plates 10 have a thickness ranging from 0.76-1.20 mm with an outer diameter of 75 to 225 mm depending upon the application. Core plates outside of this size range may also be considered for this plastic design.

Figure 1A:
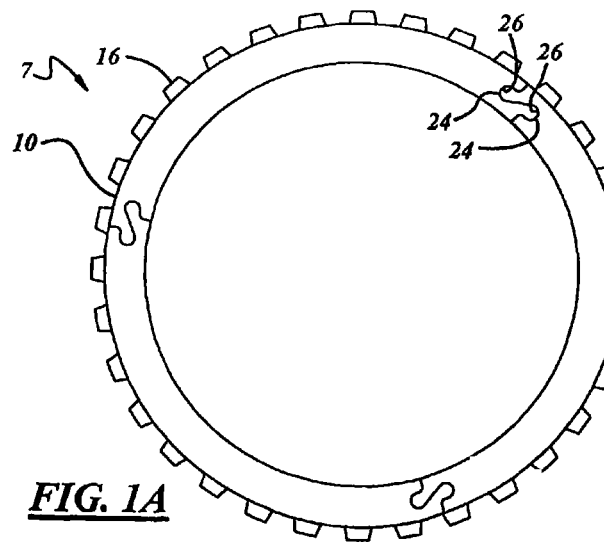
Figure 2:
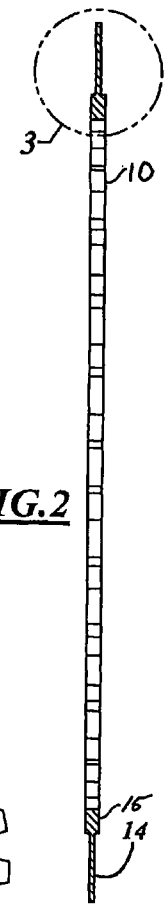
FIG. 2 is a side elevational view of a core plate utilized in the friction plate shown in FIG. 1.

Integrally connected to the rim portion 14 is an annular ring 15 with an increased uniform axial thickness. The inner diameter of the typical core plate has a series of radially inward facing spline teeth 16 (FIG. 1) geometrically cut formed from the annular ring 15. Some core plate applications (See FIG. 1A) will have radially outward facing spline teeth instead of inward facing spline teeth. The spline teeth 16 provide a torsional interface for the friction plate 7 with a rotating member (not shown). Further, some applications may not have any spline teeth at all.

Connected with the rim 14 is a friction facing 18. The friction facing may be on both sides of the core plate, or only on one side. The friction facing 18 is typically a cellulosic fiber base friction material, although other friction materials such as sintered metals, ceramics, or foam may also be used. As shown, the friction facing 18 is a paper fiber based friction material. The friction facing may be a continuous ring or may be fabricated from individual arcuate segments arranged radially. The preferred number of segments is 3-5. The segmenting of the facing 18 provides significant savings in friction material cost. The individual arcuate segments 22 have interlocking tab 24 and slot 26 end portions. Another segmented facing design provides for independent or non-interlocking facing segment arcs and can provide an oil flow path between facing segments. The friction base facing 18 can be connected with the rim 14 by adhesives or by other means as described herein.

In other embodiments the facing (full ring or segments) is first placed in open halves of an injection mold. The mold halves are closed. In a preferred application, the mold is then pressurized to hold the facing in position against a surface of the mold half. In an alternate application, the facing may be held by fixtures and or by a vacuum. Under relatively high temperatures and pressure, the molten material of the core plate 10 then injected between the mold halves. As the plastic material solidifies and forms the core plate geometry, the fibers 108 of the facing 18 are partially encapsulated by the material 112 of the core plate 10, creating a boundary layer 110 and a mechanical bond between facing and core plate. To facilitate the connection of the core plate material to the facing, the facing can have a polymeric backing or be impregnated with a polymeric saturate. In either case, the polymeric backing or saturate should have a melting temperature within 22.2 degrees C. (40 degrees F.) of the material of the core plate.

In another embodiment, the friction facing 18 is welded on. The friction facing 18 can be welded by vibration welding, spin welding, or ultrasonic welding or staking or other suitable technique. The friction facing 18 can have a polymeric backing to aid in its attachment by welding. In another embodiment, the friction facing 18 can be impregnated with a polymeric material to facilitate the welding operation. Both the polymeric saturate and backing should have melting temperatures as previously mentioned. In one embodiment, the friction facing 18 may be stacked to the core plate 10.

In another embodiment the facing 18 is connected with the rim 14 by hot platen bonding. This process can be achieved in several ways. First, this process utilizes heated platens to transfer heat through facings to achieve localized surface melting of core plate, which when under pressure, allows for a bond between the facing and core plate, as the core plate plastic cools. The heat can be applied to the facings seated on both sides of the core plate or the heat can be applied to one facing only and join both facings to the core plate rim. Second, a bonding process may use plastic core plates pre-heated to achieve localized surface melting, and then transferred into a bond press where facing is positioned to core plate, and the bond is achieved under pressure. Additionally adhesive materials may be added to either facing or core plate to facilitate and/or improve bonding in all the aforementioned bonding processes.

Referring to FIG. 4A, a partial view of a clutch pack module 27 is provided having two separate plates 34. When the separator plates 34 engage with the friction plate facings, the separator plates 34 are separated by a first distance 36. The thickness of the spline teeth 16 is greater than the thickness of the rim 14, but equal to the final design thickness 36 of the finished friction plate, to provide more strength to the spline teeth 16. Referring to FIG. 4B a clutch module 40 having a friction plate 47 has spline teeth 46 that have a thickness less than the first distance 36. Referring to FIG. 4C a clutch module 50 has a friction plate 57 with an annular ring having spline teeth 56 that are greater width than a remainder of friction plate (rim portion and friction plate) or the first distance 36.

Referring to FIG. 5 a friction plate 67 is provided wherein the friction facing 71 have a plurality of radially extending oil grooves 74. The oil grooves 74 can be formed on the facing 71 before connection with the core plate. In another embodiment, the oil grooves 74 can be cut after connection of the friction facing 71 with the underlying core plate. The cut oil grooves 74 can also extend into the core plate.

In another embodiment, the oil grooves 74 can be formed in the facing 71 and optionally in the core plate in an injection molding operation. A mold cavity will be machined with a rib to impart a slightly oversize oil groove to compensate for any spring back in the material. In another embodiment, the oil grooves 74 can be formed ultrasonically in the facing 71 and underlying core plate when the facing is ultrasonically welded to the core plate 10.

In another embodiment, the oil grooves can be formed in alternative geometries, such as single direction parallel, double direction parallel (criss-crossed), non-standard linear or non-linear pattern. Oil grooves may extend fully through facing, allowing a through oil passage, or may terminate short of outer diameter to create a dead-end groove.

In another embodiment, the oil grooves may be formed through the use of the plastic injection molding process (insert loading as described previously in this document), whereas the individual, non-connected arcuate segments are positioned with a defined gap between segments into mold, with the molding process forming the core plate and achieving the required bond between friction material and core plate.

While preferred embodiments of the present invention have been disclosed, it is to be understood it has been described by way of example only, and various modifications can be made without departing from the spirit and scope of the invention as it is encompassed in the following claims.

The invention claimed is:

1. A friction plate for wet friction clutch modules for use in car and truck automotive vehicle transmissions comprising:
    an annular polymeric core plate having an integral reduced thickness rim portion and being fabricated from a fiber reinforced thermo plastic or thermoset;
    a friction facing connected with said integral reduced thickness rim portion; and
    wherein said core plate has radial spline teeth with an axial thickness greater than the reduced thickness rim portion; and wherein the core plate has oil grooves formed thereon.

2. A friction plate as described in claim 1 wherein said core plate is fabricated from a semi-crystalline thermo plastic nylon.

3. A friction plate as described in claim 1 wherein said friction facing is segmented.

4. A friction plate as described in claim 1 wherein said friction facing is welded to said core plate.

5. A friction plate as described in claim 1 wherein said friction facing is staked to said core plate.

6. A friction plate as described in claim 1 wherein said friction facing is bonded to said core plate.

7. A friction plate as described in claim 1 wherein said friction facing is adhesively connected with said core plate.

8. A friction plate as described in claim 1 wherein said friction facing is insert molded to said core plate.

9. A friction plate as described in claim 1 wherein said friction facing has a polymeric backing.

10. A friction plate as described in claim 1 wherein said friction facing is impregnated with a polymeric saturate.

11. A friction plate as described in claim 1 wherein said core plate adjacent said facing has a textured surface.

12. A friction plate as described in claim 1 wherein said friction facing can be from the group of materials of cellulosic fiber, sintered metal, ceramic, or foam.

13. A friction plate as described in claim 1 wherein said friction facing has oil grooves formed thereon.

14. A method of manufacturing a friction plate comprising:
    providing a mold cavity;
    placing at least one fiber based friction facing within said mold cavity;
    injecting a molten polymeric core plate material into said mold cavity and over said friction facing; and
    solidifying said molten polymeric core plate material in said mold cavity to form a core plate and a boundary layer that partially encapsulates fibers from said fiber based friction facing to mechanically bond said core plate and said friction facing together.

15. A method as described in claim 14 further including forming ridges in said mold cavity to form oil grooves on said friction facing within said mold cavity.

16. A method as described in claim 14 further including forming ridges in said mold cavity to form oil grooves on said core plate within said mold cavity.

17. A method of manufacturing a friction plate comprising:
    providing a pre-heated core plate comprising a polymeric material; the core plate having opposite first and second faces; and
    connecting to said core plate a first friction facing and a second friction facing to the first and second faces respectively by pressing the first friction facing and second facing to the pre-heated core plate so that the first friction facing and second friction face are bonded to the core plate and so that the polymeric material extends from the first facing to the second facing.

18. A method of manufacturing a friction plate comprising:
    providing a core plate comprising a polymeric material;
    providing a heated platen;
    connecting to said core plate a friction facing comprising fibers by applying heat and pressure from said heated platen and through said friction facing to melt a surface of said polymeric core plate and thereafter cooling said core plate so that said friction facing and said core plate are bonded together; and
    forming a plurality of oil grooves on said core plate.

19. A method of manufacturing a friction plate comprising:

providing a core plate from a polymeric material;

providing a heated platen; and connecting to said core plate a friction facing by applying heat and pressure from said heated platen and through said friction facing to melt a surface of said polymeric core plate and thereafter cooling the core plate so that said friction facing and said core plate are bonded together, and further comprising at least one of providing a polymeric backing on said friction facing or impregnating said friction facing with a polymeric saturate to facilitate mechanically bonding said core plate and said friction facing during the cooling of the melted surface of polymeric core plate material, and wherein said polymeric backing and said polymeric saturate have a melting temperature within 40° F. of said polymeric core plate material.

* * * * *